United States Patent
Zhou et al.

(10) Patent No.: US 9,223,154 B2
(45) Date of Patent: Dec. 29, 2015

(54) DISPLAY DEVICE HAVING A CUBOID BIREFRINGENT CRYSTAL LAYER

(71) Applicant: BOE Technology Group Co., Ltd., Beijing (CN)

(72) Inventors: Xiaodong Zhou, Beijing (CN); Jaegeon You, Beijing (CN); Jikai Yao, Beijing (CN)

(73) Assignee: BOE TECHNOLOGY GROUP Co., Ltd, Beijing (CN)

( * ) Notice: Subject to any disclaimer, the term of this patent is extended or adjusted under 35 U.S.C. 154(b) by 241 days.

(21) Appl. No.: 13/995,493

(22) PCT Filed: Nov. 29, 2012

(86) PCT No.: PCT/CN2012/085533
§ 371 (c)(1),
(2) Date: Jun. 18, 2013

(87) PCT Pub. No.: WO2013/135072
PCT Pub. Date: Sep. 19, 2013

(65) Prior Publication Data
US 2014/0111845 A1    Apr. 24, 2014

(30) Foreign Application Priority Data
Mar. 16, 2012   (CN) .......................... 2012 1 0071387

(51) Int. Cl.
*G02F 1/03*    (2006.01)
*G02F 1/01*    (2006.01)

(52) U.S. Cl.
CPC ............ *G02F 1/0136* (2013.01); *G02F 1/0102* (2013.01); *G02F 1/03* (2013.01);
(Continued)

(58) Field of Classification Search
CPC .................................. G02F 1/0102; G02F 1/03
USPC .......................................................... 359/252
See application file for complete search history.

(56) References Cited

U.S. PATENT DOCUMENTS 3,862,795 A * 1/1975 Tellerman ...................... 359/252
5,715,029 A * 2/1998 Fergason ...................... 349/196
(Continued)

FOREIGN PATENT DOCUMENTS

CN    101046595 A    10/2007
CN    101326818 A    12/2008
(Continued)

OTHER PUBLICATIONS

International Search Report (Chinese language) issued by the International Searching Authority, rendered Mar. 7, 2013, 12 pages.
(Continued)

*Primary Examiner* — Zachary Wilkes

(57) ABSTRACT

A display device comprises: a first substrate (20), a first polarizer (10), a second polarizer (50), a first electrode (30), a second electrode (31), an electrically controlled birefringence crystal layer (40). The first polarizer (10) is attached to the first substrate (20). The second polarizer (50) is disposed to face the first substrate (20) and parallel to the first substrate (20). The first electrode (30) and the second electrode (31) are disposed between the first substrate (20) and the second polarizer (50) and separate from each other. The electrically controlled birefringence crystal layer (40) is disposed between the first electrode (30) and the second electrode (31) and has a primary electro-optic effect. The corresponding manufacturing method for a display is also provided.

8 Claims, 4 Drawing Sheets

(52) U.S. Cl.
CPC ............ *G02F 1/0311* (2013.01); *G02F 1/0316* (2013.01); *G02F 2201/18* (2013.01); *G02F 2202/20* (2013.01); *G02F 2203/07* (2013.01); *G02F 2203/30* (2013.01); *G02F 2203/34* (2013.01); *Y10T 29/4913* (2015.01)

(56) References Cited

U.S. PATENT DOCUMENTS

| | | | |
|---|---|---|---|
| 5,751,384 A * | 5/1998 | Sharp | 349/18 |
| 2007/0133096 A1 | 6/2007 | Bruzzone et al. | |
| 2007/0229934 A1 | 10/2007 | Makii | |
| 2014/0111845 A1 | 4/2014 | Zhou et al. | |

FOREIGN PATENT DOCUMENTS

| | | | |
|---|---|---|---|
| CN | 101373282 | A | 2/2009 |
| CN | 102707460 | A | 10/2012 |
| JP | 2210321 | A | 8/1990 |
| JP | 2005181707 | A | 7/2005 |

OTHER PUBLICATIONS

The State Intellectual Property Office of the People's Republic of China ("SIPO") (Chinese Language) Office Action issued on Jul. 30, 2013 by SIPO in Chinese Patent Application No. 201210071387.0 ; six (6) pages.

English Translation of the State Intellectual Property Office of the People's Republic of China ("SIPO") Office Action issued on Jul. 30, 2013 by SIPO in Chinese Patent Application No. 201210071387.0 ; six (6) pages.

The State Intellectual Property Office of the People's Republic of China ("SIPO") (Chinese Language) Office Action issued on Mar. 10, 2014 by SIPO in Chinese Patent Application No. 201210071387.0 ; five (5) pages.

English Translation of The State Intellectual Property Office of the People's Republic of China ("SIPO") Office Action issued on Mar. 10, 2014 by SIPO in Chinese Patent Application No. 201210071387.0 ; five (5) pages.

International Preliminary Report on Patentability for International Application No. PCT/CN2012/085533 dated Sep. 16, 2014, 8pgs.

* cited by examiner

DISPLAY DEVICE HAVING A CUBOID BIREFRINGENT CRYSTAL LAYER

CROSS REFERENCE TO RELATED APPLICATIONS

This application is based on International Application No. PCT/CN2012/085533 filed on Nov. 29, 2012, which claims priority to Chinese National Application No. 201210071387.0, filed on Mar. 16, 2012, the contents of which are incorporated herein by reference.

FIELD OF THE INVENTION

Embodiments of the present invention relate to a display device and a manufacturing method thereof.

BACKGROUND

As shown in FIG. 1, a liquid crystal display device in prior art includes: a first substrate 11, a second substrate 12 disposed opposing to the first substrate 11, and a liquid crystal layer 13 filled between the first substrate 11 and the second substrate 12. A first electrode 14 is provided on the first substrate 11, and a second electrode 15 is provided on a face of the second substrate 12 facing the first substrate 11. A backlight source 16 is located below the first substrate 11; and light emitted from the backlight source 16 is transmitted by the first substrate 11 and the first electrode 14 to be incident to the liquid crystal layer 13. Liquid crystals rotate under the action of an electric field between the first electrode 14 and the second electrode 15, so that the optical polarization state is deflected accordingly. Eventually, transmittance of light can be controlled by liquid crystals, so as to control brightness and darkness displayed by the display device.

As regards this display device with liquid crystals filled therein, however, the response speed is slow and the transmittance of light is relatively low. The reason is that the electro-optic effect of liquid crystals belongs to a secondary electro-optic effect when liquid crystals are controlled by the electric field. Thereby, optimization of optical properties of the display device is impossible, and this causes shortening of service life of the display device and limited scope of use of the display device finally.

SUMMARY

In an embodiment of the present invention, there is provided a display device, comprising: a first substrate; a first polarizer attached to the first substrate; a second polarizer, which is disposed to face the first substrate and parallel to the first substrate; a first electrode and a second electrode, which are disposed between the first substrate with the first polarizer attached and the second polarizer and separate from each other; and an electrically controlled birefringence crystal layer, which is disposed between the first electrode and the second electrode and has a primary electro-optic effect.

In another embodiment of the invention, there is provided a manufacturing method of a display device, comprising: providing a first substrate; providing a first polarizer and attaching it to the first substrate; providing a second polarizer and disposing it to face the first substrate; forming a first electrode and a second electrode which separate from each other on the first substrate with the first polarizer attached or on the second polarizer, so that the first electrode and the second electrode are interposed between the first substrate and the second polarizer; and forming an electrically controlled birefringence crystal layer with a primary electro-optic effect between the first electrode and the second electrode.

In the above schemes, an electrically controlled birefringence crystal material is used as an optical modulation material to replace liquid crystals, and variance in optical polarization state is achieved with the primary electro-optic effect (Pockels electro-optic effect) of this kind of material, so as to achieve display. Because an electrically controlled birefringence crystal is used to realize display, the display device in embodiments of the invention is an all-solid-state display, and has a high transmittance of light, a high resolution, and a fast response speed, causing better optical properties and a wide application scope of the display device.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not (imitative of the invention.

DETAILED DESCRIPTION in order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

Figure 1:
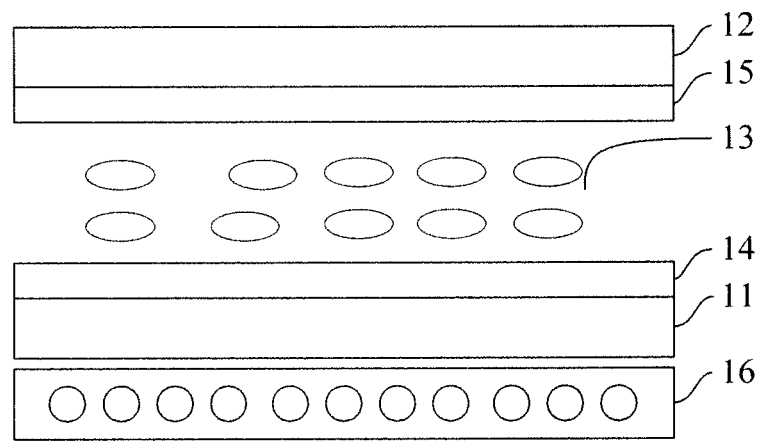
FIG. 1 is a structurally schematic view showing an existing liquid crystal display device.
Figure 2:
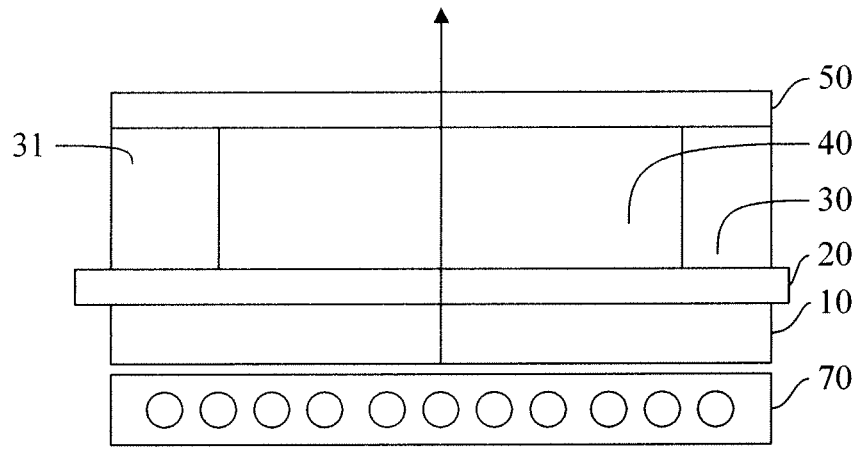
FIG. 2 is a structurally schematic view showing a first embodiment of a display device according to the invention.

As shown in FIG. 2, an all-solid-state display device according to a first embodiment of the invention comprises:

a first substrate 20; a first polarizer 10, which is disposed below the first substrate 20 and parallel to the first substrate 20; a second polarizer 50, which is disposed above the first substrate 20 and parallel to the first substrate 20; a first electrode 30 and a second electrode 31, which are disposed between the first substrate 20 and the second polarizer 50; and an electrically controlled birefringence crystal layer 40, which is disposed between the first electrode 30 and the second electrode 31, actualizes display and has a primary electro-optic effect.

The first electrode 30 and the second electrode 31 may be disposed in accordance with a state where the direction of an electric field is parallel or perpendicular to the first substrate 20; and the electric field is an electric field generated between the first electrode 30 and the second electrode 31. The electrically controlled birefringence crystal layer 40 with the primary electro-optic effect actualizes display under the action of the electric field.

In the above example, the first polarizer 10 is disposed below the first substrate 20. However, embodiments according to the invention are not limited thereto. The first polarizer 10 may also be attached to the first substrate 20 from above. That is, the first electrode 30, the second electrode 31 and the electrically controlled birefringence crystal layer 40 may be disposed between the first substrate 20 with the first polarizer 10 attached and the second polarizer 50, and thus the electrically controlled birefringence crystal 40 can be disposed between the first and second polarizers 10 and 50, resulting in the fact that light passes through the first polarizer 10, the electrically controlled birefringence crystal 40 and the second polarizer 50 in sequence.

Additionally, according to the embodiments of the invention, the arrangement relationship of transmission axes of the first polarizer 10 and the second polarizer 50 is not specifically restricted, and various suitable arrangement relationships may be adopted. For example, transmission axes of the two polarizers may be arranged in a parallel configuration for use in a normally black work mode or a perpendicular configuration for use in a normally white work mode, and details are omitted here.

In one example, the all-solid-state display device further comprises: a backlight source 70 which is disposed below the first substrate 20 and parallel to the first substrate. That is, the backlight source 70 may be disposed on a side of the first substrate 20 opposite to the side on which the second polarizer 50 is disposed.

In the first embodiment, by virtue of provision of electrodes in a transverse electric field mode, that is, the first electrode 30 and the second electrode 31 may be disposed in accordance with a state that direction of the electric field is parallel to the first substrate 20, the electrically controlled birefringence crystal layer 40 with the primary electro-optic effect (which is solid-state crystalline) produces a birefringence phenomenon under the action of the transverse electric field between the first electrode 30 and the second electrode 31, so that light generated by the backlight source are changed from a linear polarization state after it passes through the first polarizer 10 to other polarization state (such as, a circular polarization state, a linear polarization state, or an elliptic polarization state). Afterwards, they enter the second polarizer 50, and a luminance change occurs to the light after it is modulated (polarization detected) by the layer of the second polarizer 50 (occurrence of grayscales); so as to realize color display. As compared to a conventional liquid crystal display device, a liquid crystal layer is replaced by the electrically controlled birefringence crystal layer, and transmittance of light is high and response speed is fast according to the embodiment of the invention, causing better optical properties of the display device.

In the embodiment, no color filter is provided on the second polarizer 50, and a field sequential control mode can be adopted to realize color display. The procedure of realizing color display by the field sequential control mode includes: RGB light is emitted from the backlight source 70 in sequence, grayscale variance occurs after it is modulated by the electrically controlled birefringence crystal layer 40 with the primary electro-optic effect, and at last, different colors are generated by mixture, thereby achieving color display. In that mode, it is possible that resolution of the display device is increased to be about three times as much as that of a display device of the same size as original.

Figure 3:
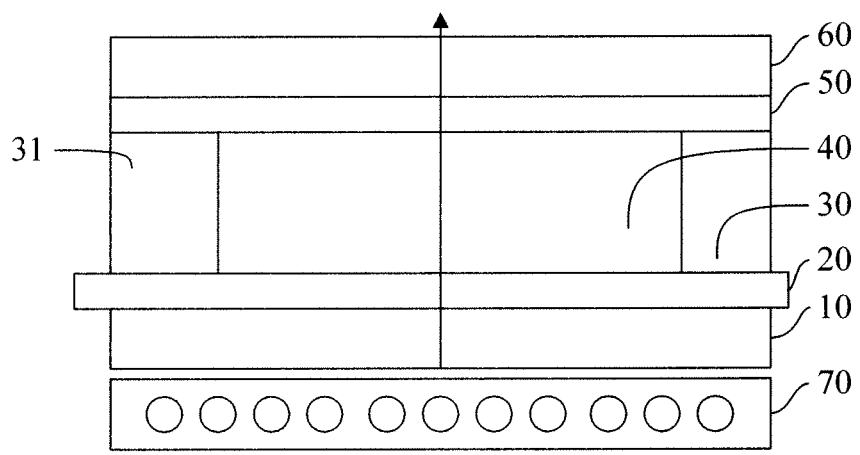
FIG. 3 is a structurally schematic view showing a second embodiment of a display device according to the invention.

In the embodiment, as shown in FIG. 3, the all-solid-state display device may further comprise: a color filter layer 60 disposed over the second polarizer 50. Also, although only a case where the color filter 60 is located over the second polarizer 50 is illustrated in FIG. 3, embodiments according to the invention are not limited thereto. For example, positions of the color filter 60 and the second polarizer 50 can be interchanged, namely, the color filter layer 60 may be disposed under the second polarizer 50. The first substrate 20 is an array substrate having a thin film transistor structure (TFT). The backlight source 70 emits ordinary white light in sequence, grayscale variance occurs after the light is modulated by the electrically controlled birefringence crystal layer 40, and at last, different colors are generated by mixture, thereby achieving color display.

When the first substrate 20 is a TFT array substrate, gate lines and data lines are formed on the array substrate, and gate lines and data lines cross with each other to define pixel units. Thin film transistors are formed within the pixel units, and are turned on or off under the control of the gate lines.

The display device may further comprise: a gate driver connected to the gate lines of the TFT array substrate, which acts to transmit a scan signal to the TFT array substrate; and a source driver connected to the data lines of the TFT array substrate, which acts to transmit a data signal to the TFT array substrate. In one example, the display device may further comprise: a package part, for packaging the display device to be a finished display device.

In the first embodiment, light emitted from the backlight source 70 turns into linearly polarized light (polarized) after it is modulated by the first polarizer 10, and then the linearly polarized light enters the electrically controlled birefringence crystal layer 40 with the primary electro-optic effect; the electrically controlled birefringence crystal layer 40 produces a birefringence phenomenon under the action of a transverse electric field, so that the light is changed from a linear polarization state to a circular polarization state or a polarization state perpendicular to the original linearly polarized light, and afterwards, it enters the second polarizer 50; a luminance change occurs to the light after it is modulated (polarization detected) by the second polarizer 50 (occurrence of grayscales); and the light is transmitted by color filter layers in different primary colors, and colors are generated from mixture of the light in different primary colors for color display. As compared to a conventional liquid crystal display device, a liquid crystal layer is replaced by the electrically controlled birefringence crystal layer with the primary electro-optic effect, and transmittance of light is high in the embodiment of the invention, causing better optical properties of the display device.

In a second embodiment of the invention, the first electrode 30 and the second electrode 31 may be disposed in accordance with a state where the direction of an electric field is perpendicular to the first substrate 20. The electrically controlled birefringence crystal layer 40 with the primary electro-optic effect is solid-state crystalline, and produces a birefringence phenomenon under the action of a longitudinal electric field between the first electrode and the second electrode, so that light generated by the backlight source is changed from a linear polarization state after it passes through the first polarizer 10 to other polarization state (such as, a circular polarization state, a linear polarization state, or an elliptic polarization state). Afterwards, it enters the second polarizer 50, and a luminance change occurs to the light after it is modulated (polarization detected) by the layer of the second polarizer 50 (occurrence of grayscales); so as to realize color display. As compared to a conventional liquid crystal display device, a liquid crystal layer is replaced by the electrically controlled birefringence crystal layer, and transmittance of light is high and response speed is fast according to the embodiment of the invention, causing better optical properties of the display device. Certainly, in the second embodiment, it is also possible that no color filter layer is provided over the second polarizer 50, and in this case, a backlight source is required to provide RGB light; when color filter layers are provided over the second polarizer 50, ordinary white light can be provided by a backlight source. Specific implementation principle is the same as stated in the first embodiment, and details are omitted here.

In the above first and second embodiments, for example, the crystal material for the primary electro-optic effect may be: niobate crystal or potassium dihydrogen phosphate crystal. Preferably, the crystalline pixel layer has the shape of a cuboid, and preferably, the shape of a flat cuboid, namely, the thickness of the cuboid is lamer than or far larger than the width of the cuboid, and thus a driving voltage between the first electrode 30 and the second electrode 31 can be reduced.

According to the above embodiments of the invention, the primary electro-optic effect of electrically controlled birefringence crystal is utilized to realize control of light, to thereby achieve display. In practical applications, electrically controlled birefringence crystal with the primary electro-optic effect is always formed by cutting along some special directions relative to an optical axis, and an externally-applied electric field is also applied to the crystal along a certain main axis direction. There are two common modes: one mode is that direction of an electric field is parallel to the direction along which light beams travel in the crystal, which is called as a longitudinal electro-optic effect; another mode is that direction of an electric field is perpendicular to the direction along which light beams travel in the crystal, which is called as a transverse electro-optic effect.

The primary electro-optic effect of crystal will be introduced as follows:

When an electric field is externally applied to crystals, refractive index of the crystal will change, and this phenomenon is an electro-optic effect. A relational expression of change in refractive index which is caused by an externally-applied electric field E is:

$$n = n_0 + aE + bE^2 + \ldots \quad (1)$$

Where a and b are constants, $n_0$ is a refractive index when E=0. The effect that a change in the refractive index is caused by a first-order term aE is called as the primary electro-optic effect or electro-optic effect, and also called as Pockels effect. The primary electro-optic effect only occurs in twenty kinds of crystals without a center of symmetry. The effect that a change in the refractive index is caused by a second-order term $bE^2$ is called as the secondary electro-optic effect (also called as quadratic electro-optic effect) or Kerr effect. The secondary electro-optic effect may occur in any substance. Generally, the primary electro-optic effect is more striking than the secondary electro-optic effect, and the electro-optic effect of liquid crystals belongs to the secondary electro-optic effect.

Figure 4:
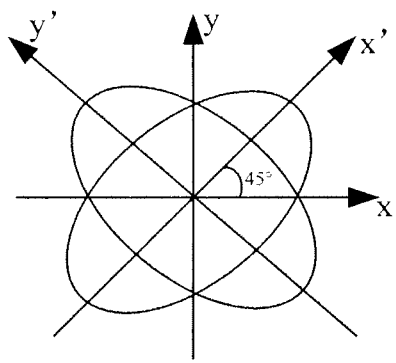
FIG. 4 is a schematic view showing the change in an ellipsoid of refractivity of an electrically controlled birefringence crystal material after an electric field is applied to it according to the invention.

Firstly, as shown in FIG. 4, the electric-optic effect is generally analyzed with the change in an ellipsoid of refractivity, and an ellipsoid equation of refractivity when no electric field is applied is:

$$\frac{x^2}{n_x^2} + \frac{y^2}{n_y^2} + \frac{z^2}{n_z^2} = 1 \quad (2)$$

In this equation, $n_x$, $n_y$, and $n_z$ are main refractivities along three main axes x, y and z, respectively. Under the action of an externally-applied electric field, a change in the ellipsoid of refractivity occurs to the crystal, namely, position and length for the three main axes of the ellipsoid are changed, the size of variation is related to the size and direction of the externally-applied electric field E and properties of the crystal.

When an electric field is applied to the crystal, the ellipsoid of refractivity of them is "deformed", and the ellipsoid equation turns into:

$$\left(\frac{1}{n^2}\right)_1 x^2 + \left(\frac{1}{n^2}\right)_2 y^2 + \left(\frac{1}{n^2}\right)_3 z^2 + 2\left(\frac{1}{n^2}\right)_4 yz + 2\left(\frac{1}{n^2}\right)_5 xz + 2\left(\frac{1}{n^2}\right)_6 xz = 1 \quad (3)$$

Because of the external electric field, coefficients $(1/n^2)$ of the ellipsoid of refractivity are linearly changed accordingly, and the amount of variation can be defined as:

$$\Delta\left(\frac{1}{n^2}\right)_i = \sum_{j=1}^{3} \gamma_{ij} E_j \quad (4)$$

In this equation, $\gamma_{ij}$ is called as a linear electro-optic coefficient; i takes the values 1, ..., 6; and j takes the values 1, 2 and 3.

In one embodiment of the invention, when potassium dihydrogen phosphate ($KH_2PO_4$, briefly called as KDP) crystal is used as the electrically controlled crystal material of the invention, based on the above equations (1), (2), (3) and (4), we have $n_x = n_y = n_o$, $n_z = n_e$, $n_o > n_e$, only $\gamma_{41}$, $\gamma_{52}$, $\gamma_{63} \neq 0$, and $\gamma_{41} = \gamma_{52}$.

A new ellipsoid equation of refractivity after an external electric field E is applied is obtained:

$$\frac{x^2}{n_o^2} + \frac{y^2}{n_o^2} + \frac{z^2}{n_e^2} + 2r_{41}yzE_x + 2r_{41}xzE_y + 2r_{63}xyE_z = 1 \quad (5)$$

Figure 5:
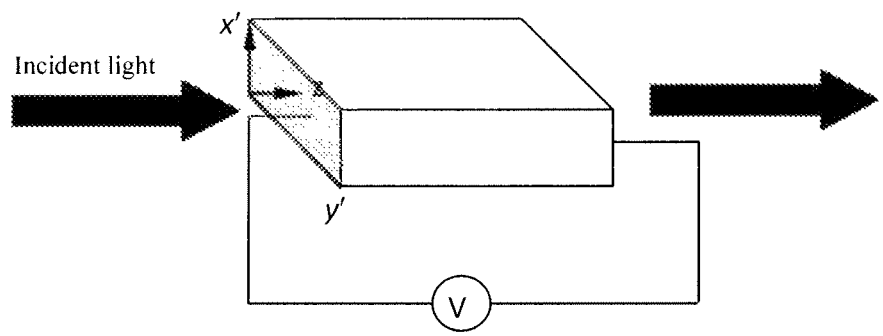
FIG. 5 is a schematic view showing a longitudinal application of potassium dihydrogen phosphate (KDP) crystals under the action of a longitudinal electric field in an embodiment of the invention.

As shown in FIG. 5, that is, when KDP crystal is used in a longitudinal electric field, let the direction of the externally-applied electric field be parallel to a Z axis, Ez=E, and Ex=Ey=0, then we get:

$$\frac{x^2}{n_o^2} + \frac{y^2}{n_o^2} + \frac{z^2}{n_e^2} + 2r_{63}xyE_z = 1 \quad (6)$$

Rotating an X coordinate and a Y coordinate around the Z axis by an angle α, an induced main axis coordinate system (x', y', z') is obtained, and when α=45°, the ellipsoid equation in the main axis coordinate system is:

$$\left(\frac{1}{n_o^2} + r_{63}E_z\right)x'^2 + \left(\frac{1}{n_o^2} - r_{63}E_z\right)y'^2 + \frac{1}{n_e^2}z'^2 = 1 \tag{7}$$

Main retractivities turn into:

$$\left.\begin{array}{l} n_{x'} = n_o + \frac{1}{2}n_o^3 r_{63} E_z \\ n_{y'} = n_o - \frac{1}{2}n_o^3 r_{63} E_z \\ n_{z'} = n_e \end{array}\right\} \tag{8}$$

As can be seen, when an electric field is applied to KDP crystal along the Z axis, single-axis crystals becomes double-axis crystals, and a main axis of an ellipsoid of refractivity is rotated around the Z axis by an angle of 45' (as shown in FIG. 4), which rotating angle has nothing to do with the size of the externally-applied electric field. The variance in its refractivity is directly proportional to the electric field, and this is the physical basis on which an optical modulation technology is implemented with the electro-optic effect.

In the application of KDP to a longitudinal electric field, the electric field is applied along the Z axis of crystal, light waves travel along the Z axis, and a birefringence characteristic of the crystalline layer depends on an ellipse formed by intersection of the ellipsoid with a plane perpendicular to the Z axis. Let z' in the equation (7) be equal to zero, such an equation for the ellipse is obtained:

$$\left(\frac{1}{n_o^2} + r_{63}E_z\right)x'^2 + \left(\frac{1}{n_o^2} - r_{63}E_z\right)y'^2 = 1 \tag{9}$$

Long and short half axes coincide with x' and y', respectively, x' and y' are then polarization directions of two components, and corresponding refractivities are nx' and ny', as shown in FIG. 5.

When the incidence light is polarized along an X direction, it is then divided into two vertical polarization components along x' and y' directions after entering a crystal (z=0). When they travel L within the crystal, optical distances are nx'L and ny'L, respectively, so, phase delays for the two polarization components are respectively:

$$\varphi_{x'} = \frac{2\pi}{\lambda}n_{x'}L = \frac{2\pi L}{\lambda}\left(n_o + \frac{1}{2}n_o^3 r_{63}E_z\right) \tag{10}$$
$$\varphi_{y'} = \frac{2\pi}{\lambda}n_{y'}L = \frac{2\pi L}{\lambda}\left(n_o + \frac{1}{2}n_o^3 r_{63}E_z\right)$$

After the two light waves pass through the crystal, such a phase difference will be produced:

$$\Delta\varphi = \varphi_{x'} - \varphi_{y'} = \frac{2\pi}{\lambda}Ln_o^3 r_{63} E_z = \frac{2\pi}{\lambda}n_o^3 r_{63} V \tag{11}$$

This phase delay is totally caused by birefringence attributed to an electro-optic effect, and so it is called as an electro-optic phase delay. As can be seen from the equation (11), after the electro-optic crystal and the light wavelength to be transmitted are determined, variance in the phase difference is merely dependent on an externally-applied voltage. That is, the phase can be proportionally changed only by changing the voltage, so as to realize modulation of light. Alternatively, in order to reduce a driving voltage, we may also look for a crystal material which has a larger primary electro-optic coefficient.

Figure 6:
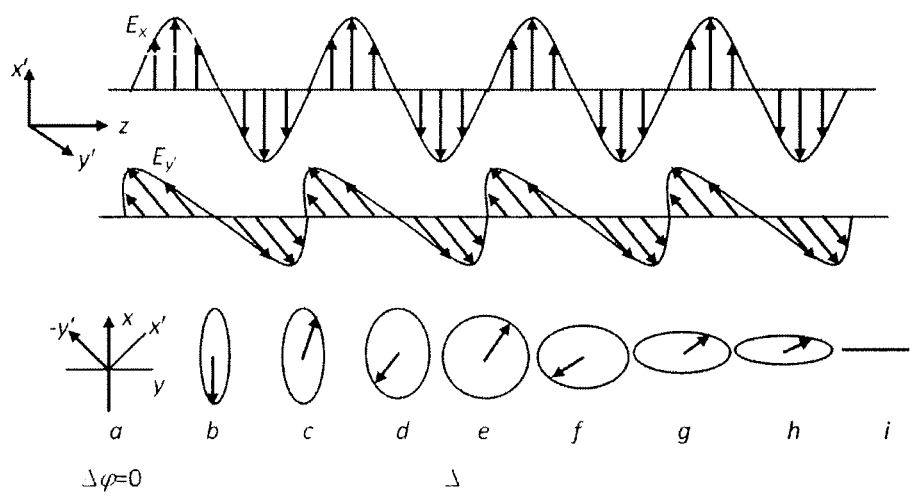
FIG. 6 is a schematic view showing the change in polarization state of a light wave in a longitudinally used KDP crystal in an embodiment of the invention.

FIG. 6 is a schematic view showing the change in polarization state of a light wave in a longitudinally used KDP crystal in an embodiment of the invention.

Figure 7:
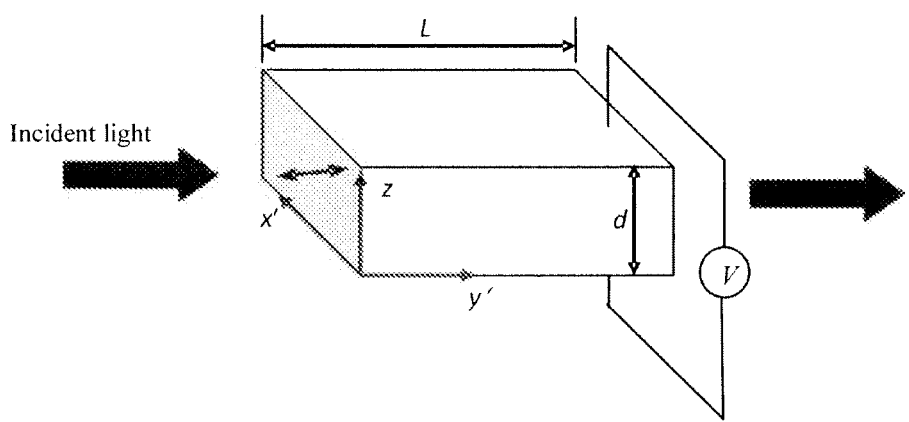
FIG. 7 is a schematic view showing a transverse application of KDP crystals under the action of a transverse electric field in an embodiment of the invention.
Figure 8:
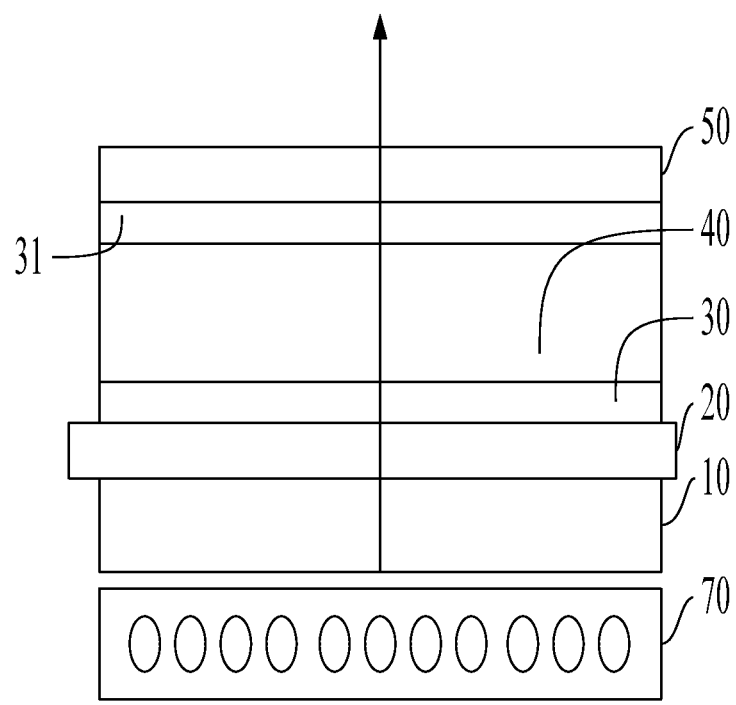
FIG. 8 is a schematic view showing a display device according to an embodiment of the invention.
Figure 9:
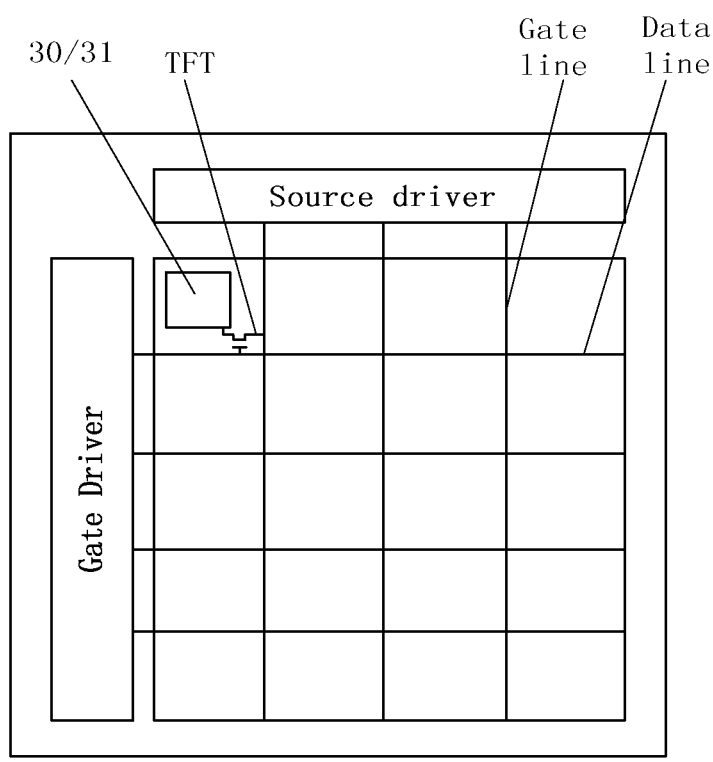
FIG. 9 is a schematic view showing a display device according to an embodiment of the invention.

As shown in FIG. 7, when KDP is used in a transverse electric field, if the electric field is applied along the Z direction, then transmitting direction of a light beam is perpendicular to the Z axis and makes an angle of 45° with a y (or x) axis. For this mode of use, a 45°-z crystal cut is generally adopted, as shown in the figure.

Let a light wave be incident perpendicularly to an x'-z plane, and an E vector makes an angle of 45' with the Z axis. As shown in FIG. 7, after entering a crystal (y'=0), it is divided into two vertical polarization components along x' and z directions, respectively. The corresponding refractivities are $$n_{x'} = n_o - \frac{1}{2}n_o^3 r_{63} E_z$$

and $n_z = n_e$, respectively.

After they travel a L distance,
an x' component is $$A_{x'} = A\exp\left\{i\left[\omega t - \left(\frac{\omega}{c}\right)\left(n_o - \frac{1}{2}n_0^3 r_{63} E_z\right)L\right]\right\} \tag{12}$$

a z component is $$A_z = A\exp\left\{i\left[\omega t - \left(\frac{\omega}{c}\right)n_e L\right]\right\} \tag{13}$$

phase delays for the two polarization components are respectively:

$$\varphi_{x'} = \frac{2\pi}{\lambda}n_{x'}L = \frac{2\pi L}{\lambda}\left(n_o + \frac{1}{2}n_o^3 r_{63}E_z\right) \tag{14}$$
$$\varphi_z = \frac{2\pi}{\lambda}n_z L = \frac{2\pi L}{\lambda}n_e$$

Therefore, after the two light waves pass through the crystal, such a phase difference will be produced:

$$\Delta\varphi = \varphi_{x'} - \varphi_z = \Delta\varphi_0 + \frac{\pi}{\lambda}n_o^3 r_{63}\left(\frac{L}{D}\right)V \tag{15}$$

As can be seen, in the condition of transverse application, the phase difference for the light waves after they pass through the crystal includes two terms: a first term is irrelative to the externally-applied electric field and is caused by natural birefringence of the crystal per se, and in a practical application, it can be eliminated by setting of some parameters; and a second term is an electric-optic effect phase delay.

For the transverse application of KDP crystal, application of an electric field along an x or y direction may also be adopted, and light beams travel along a direction perpendicular to it.

Other crystal materials with the primary electro-optic effect among a tetragonal crystal system also have a similar derivative process. Equations similar to the equation (11) and the equation (15) can be obtained.

In another embodiment of the invention, with a lithium niobate crystal in a trigonal crystal system as an example, the lithium niobate crystal is a negative uniaxial crystal, namely, $n_x = n_y = n_0$, and $n_z = n_e$. There are four electro-optic coefficients for a 3 m point group of the trigonal crystal system to which it belongs, i.e. $\gamma^{22}$, $\gamma^{13}$, $\gamma^{33}$, $\gamma^{51}$. Thereby, such an ellipsoid equation of refractivity for the lithium niobate crystal after an electric field is externally applied can be obtained:

$$\left(\frac{1}{n_0^2} - \gamma_{22}E_y + \gamma_{15}E_z\right)x^2 + \left(\frac{1}{n_0^2} + \gamma_{22}E_y + \gamma_{13}E_z\right)y^2 + \left(\frac{1}{n_e^2} + \gamma_{33}E_z\right)z^2 + 2\gamma_{51}(E_z yz + E_x xz) - 2\gamma_{22}E_x xy = 1 \quad (16)$$

The lithium niobate crystal adopts such a mode of use: 45°-z cut, application of voltage along an x axis or a y axis, and incidence of light along a z axis. When an electric field (namely, a transverse electric field) is externally applied along the x main axis, we have $E_z = E_y = 0$, x and y main axes of the crystal will be rotated, and the equation (5) turns into:

$$\frac{x^2}{n_o^2} + \frac{y^2}{n_o^2} + \frac{z^2}{n_e^2} + 2r_{51}xzE_z - 2r_{22}xyE_z = 1 \quad (17)$$

Because $\gamma_{51}E_x \ll 1$, a corresponding term can be omitted. After a coordinate transformation, main refractivities on three induced main axes x', y', z' (it is still in a z direction) can be found as illustrated by an equation 08).

Wherein, the lithium niobate crystal turns to be a double-axis crystal, the direction and thickness for a z axis of its ellipsoid of refractivity substantially remain unchanged, and an x-y cross section with a radius of $n_0$ is changed to be an ellipse. x' and y' (directions of long and short axes of the ellipse) are rotated by 45° with respect to original x and y axes, size of the rotating angle is irrelative to size of the externally-applied electric field, and sizes of lengths $n_x$ and $n_y$ of the ellipse are in linear relationships with the externally-applied electric field $E_x$.

$$\left.\begin{aligned} n_{x'} &= n_o + \frac{1}{2}n_o^3 r_{22}E_z \\ n_{y'} &= n_o - \frac{1}{2}n_o^3 r_{22}E_z \\ n_{z'} &= n_e \end{aligned}\right\} \quad (18)$$

In the case where light travels along a z direction of an optical axis of the lithium niobate crystal, after it passes through the crystal with a thickness of l, due to a transverse electro-optic effect (x-z) of the crystal, such a phase difference will be produced between two orthogonal polarization components:

$$\delta = \frac{2\pi}{\lambda}(n_x' - n_y')l = \frac{2\pi}{\lambda}n_0^3\gamma_{22}V_x\frac{l}{d} \quad (19)$$

Where, d is a transverse dimension of the crystal in an x direction (it can be understood as a crystal width, namely, a distance between electrodes).

In application to the display device according to embodiments of the invention, in the embodiments as given above about a transverse electric field for crystals, as can be seen from the equation (15) and the equation (19), V or $V_x$ is an externally-applied driving voltage. As can be seen from the equation (15) and the equation (19), a phase difference attributed to a transverse electro-optic effect of a KDP crystal and a lithium niobate crystal is not only directly proportional to the driving voltage, but also has something to do with a ratio of thickness to width (l/d) of the crystals. Thus, in practical applications, in order to decrease the externally-applied driving voltage, l/d is usually made to be a larger value, namely, the crystals are processed to have the shape of a cuboid. Preferably, thickness l of the cuboid is larger than or far larger than width d of the cuboid, namely, the crystals are usually processed to be slim, flat cuboids. Alternatively, we may also look for a crystal material which has a larger primary (first-order) electro-optic coefficient, and the driving voltage can be reduced as well. In the above mode of transverse electro-optic effect, thickness of a crystal refers to size of the crystal along a light transmitting direction, and width of the crystal refers to size of the crystal perpendicular to the light transmitting direction and along an electric field direction produced between two electrodes.

An electro-optic coefficient $\gamma_{22}$ of a lithium niobate crystal is equal to $6.8 \times 10^{-12}$ m/V, a light wave with a equal to 632.8 mm is adopted here, $n_0 \approx 2.2956$, $n_e \approx 2.2044$.

As can be seen from the above contents, for green light of 550 nm, if the driving voltage for a generated phase difference of π/2 is to be made as about 10V, then 1/d should be about 300, that is, when an electrode distance d is 5 μm, thickness l of the lithium niobate crystalline layer should be 1.5 mm. If thickness l of the lithium niobate crystalline layer is to be decreased, then the distance d between the first electrode 30 and the second electrode 31 should be shortened (namely, thickness of the electrically controlled birefringence crystal layer is directly proportional to the distance between the first electrode and the second electrode), or alternatively, we look for a crystal material which has a larger primary electro-optic coefficient (namely, thickness of the electrically controlled birefringence crystal layer is inversely proportional to the primary electro-optic coefficient of the electrically controlled birefringence crystal).

Other crystal materials with the primary electro-optic effect among the trigonal crystal system also have a similar derivative process. An equation similar to the equation (19) can be obtained, thickness l of a crystalline layer is directly proportional to the distanced between the first electrode and the second electrode, or thickness l of a crystalline layer is inversely proportional to the primary electro-optic coefficient of the electrically controlled birefringence crystal.

Comparing the two cases (longitudinal application and transverse application) of a lithium niobate crystal and a KDP crystal, the following two conclusions can be made:

Firstly, upon transverse application, intrinsic phase delays produced by natural birefringence are present, and they are irrelative to an externally-applied electric field. It shows that in case of no externally-applied electric field, for two polarization components of an incident light, their polarization planes have already been rotated by an angle after they pass through the crystal. This is disadvantageous to application to an optical modulator and so on, and we should try to eliminate it.

Secondly, upon transverse application, no matter which manner is adopted, a total phase delay is not only directly proportional to an applied voltage, but also relative to a thickness-to-width ratio (l/d) of the crystal. Therefore, a driving voltage can be reduced largely by way of increasing l or decreasing d.

Thirdly, upon longitudinal application, the phase difference is only relative to $V=E_z L$.

In addition, in case of a transverse electric field, size of a driving voltage is in an inversely proportional relationship with a primary electric-optic coefficient of a crystal material, and is in an inversely proportional relationship with the thickness-to-width ratio id) of the crystal. In case of a longitudinal electric field, size of a driving voltage is in an inversely proportional relationship with the primary electric-optic coefficient of the crystal material. In case of the transverse electric field, when the driving voltage is constant, thickness of the electrically controlled birefringence crystal layer with the primary electric-optic effect is directly proportional to the distance between the first electrode and the second electrode, or, thickness of the electrically controlled birefringence crystal layer with the primary electric-optic effect is inversely proportional to the primary electric-optic coefficient of the electrically controlled birefringence crystal.

In the above embodiments of the invention, the electrically controlled birefringence crystal material with the primary electric-optic effect has been described with reference to examples of a lithium niobate crystal and a KDP crystal, but it is not limited to the lithium niobate crystal and the KDP crystal. As can be appreciated by those skilled in the art, the electrically controlled birefringence crystal material with the primary electric-optic effect may also comprises other crystal whose properties are similar to properties of the lithium niobate crystal or the KDP crystal.

According to the above embodiments of the invention, by way of replacing an existing liquid crystal material with an electrically controlled birefringence crystal material with the primary electric-optic effect, the liquid crystal display device becomes an all-solid-state display. Such a physical state of the liquid crystal state exists within a certain temperature range, scope of use of existing liquid crystal display devices are thus limited as well (−20° C.-−50° C.), and the liquid crystal displays cannot display normally in a space at a lower or higher temperature. If the crystal material of the invent on is used for display, this problem can be better solved. Their properties can be maintained within a temperature range from about fifty degrees below zero to two or three hundred Celsius degrees, their application scope can be expanded, and service life of the display devices can be prolonged. And, transmittance of the electrically controlled birefringence crystal material is high, and optical properties and electrical properties are good. The electrically controlled birefringence crystal material has a fast response speed which can reach $10^{-9}$ s, and it may utilize a color spatial operation, and may also adapted to a color sequential operation mode.

According to an embodiment of the invention, there is further provided a manufacturing method of an all-solid-state display device, comprising:

Step 11, a first substrate is provided;

Step 12, a first polarizer is attached to the first substrate from below;

Step 13, a second polarizer which is disposed opposing to the first substrate is provided;

Step 14, a first electrode and a second electrode are formed on the first substrate or on the second polarizer; and Step 15, an electrically controlled birefringence crystal layer with a primary electro-optic effect is formed between the first electrode and the second electrode.

Additionally, although the description has been given to an example in which the first polarizer is disposed below the first substrate in the above method, as stated in the description of the structure of the display device in the preceding parts, the first polarizer may also be attached to the first substrate from above.

Wherein, the first electrode and the second electrode are formed in accordance with a state where the direction of an electric field is parallel or perpendicular to the first substrate; in which, the electric field is an electric field between the first electrode and the second electrode; and the electrically controlled birefringence crystal layer actualizes display under the action of the electric field.

For example, a metal layer where the first electrode and the second electrode are located is formed by means of sputtering or evaporation, and is etched so as to form the first electrode and the second electrode; or, the electrically controlled birefringence crystal layer is formed by means of sputtering or evaporation.

The above method may further comprises: a backlight source being assembled to the first polarizer from below.

For example, in the embodiment of above steps 11 to 15, color display is achieved with a field sequential control mode. Its specific display method is the same as that described in an embodiment of the above all-solid-state-display. In the example, by virtue of provision of electrodes in a IPS (transverse electric field) mode, that is, direction of an electric field between the first electrode and the second electrode is parallel to the first substrate, the electrically controlled birefringence crystal layer (which is solid-state crystalline) produces a birefringence phenomenon under the action of the transverse electric field between the first electrode and the second electrode, so that light generated by the backlight source are changed from a linear polarization state after it passes through the first polarizer to other polarization state (such as, a circular polarization state, a linear polarization state, or an elliptic polarization state); afterwards, they enter the second polarizer, and a luminance change occurs to the light after it is modulated (polarization detected) by the layer of the second polarizer (occurrence of grayscales); so as to realize color display. As compared to a conventional liquid crystal display device, a liquid crystal layer is replaced by the electrically controlled birefringence crystal layer, and transmittance of light is high according to the embodiment of the invention, causing better optical properties of the display device.

Certainly, when the direction of an electric field between a first electrode and a second electrode is perpendicular to a first substrate, the above effect can also be achieved.

In an embodiment of the manufacturing method, the above method may further comprise: color filter layers are produced; and the color filter layers are bonded to or integrated with the second polarizer. Light emitted from the backlight source turns into linearly polarized lights (polarized) after it is modulated by the layer of the first polarizer, and then the linearly polarized light enters the electrically controlled birefringence crystal layer; the electrically controlled birefringence crystal layer produces a birefringence phenomenon under the action of a transverse electric field, so that the light is changed from a linear polarization state to other polarization state (such as, a circular polarization state, a linear polarization state or an elliptic polarization state), and afterwards, it enters the layer of the second polarizer; a luminance change occurs to the light after it is modulated (polarization detected) by the layer of the second polarizer (occurrence of grayscales); and the light is transmitted by the color filter layers in different primary colors, and colors are generated from mixture of the light in different primary colors for color display. As compared to a conventional liquid crystal display device, a liquid crystal layer is replaced by the electrically controlled birefringence crystal layer, and transmittance of light is high in the embodiment of the invention, causing better optical properties of the display device.

Also, in the above embodiments of the method, the first substrate is an array substrate with a thin film transistor structure (TFT), and the TFT is located at the first electrode and/or the second electrode on the first substrate, so as to realize control of the electric field between the first electrode and the second electrode.

According to embodiments of the invention, at least the following structures and methods can be provided:

(1) A display device, comprising:
  a first substrate;
  a first polarizer attached to the first substrate;
  a second polarizer, which is disposed to face the first substrate and parallel to the first substrate;
  a first electrode and a second electrode, which are disposed between the first substrate with the first polarizer attached and the second polarizer and separate from each other; and
  an electrically controlled birefringence crystal layer, which is disposed between the first electrode and the second electrode and has a primary electro-optic effect.

(2) The display device according to (1), wherein the first electrode and the second electrode are disposed in accordance with a state in which a direction of an electric field generated therebetween is parallel or perpendicular to the first substrate, and the electrically controlled birefringence crystal layer modulates light passing therethrough under the action of the electric field.

(3) The display device according to (1) or (2), wherein the electrically controlled birefringence crystal layer changes a polarization state of the light passing through the electrically controlled birefringence crystal layer under the action of the electric field.

(4) The display device according to any of (1) to (3), further comprising:
  a backlight source which is disposed on a side of the first substrate opposite to the side on which the second polarizer is disposed and parallel to the first polarizer.

(5) The display device according to (4), wherein the backlight source is a RGB light source, and the display device adopts a field sequential control mode to achieve color display.

(6) The display device according to any of (1) to (3), further comprising:
  color filter layers provided on the second polarizer.

(7) The display device according to any of (1) to (6),
  wherein the first substrate is an array substrate having a thin film transistor structure; and,
  wherein, the array substrate are formed with gate lines and data lines thereon and the gate lines and the data lines cross with each other to define pixel units, within which thin film transistors are formed, and the thin film transistors are turned on or off under the control of the gate lines.

(8) The display device according to (7), further comprising:
  a gate driver, which is connected to the gate lines of the array substrate and transmits a scan signal to the gate lines of the array substrate; and
  a source driver, which is connected to the data lines of the array substrate and transmits a data signal to the data lines of the array substrate.

(9) The display device according to any of (1) to (8), wherein the electrically controlled birefringence crystal with the primary electro-optic effect is a lithium niobate crystal or a potassium dihydrogen phosphate crystal.

(10) The display device according to (9), wherein the lithium niobate crystal or the potassium dihydrogen phosphate crystal is shaped in a cuboid.

(11) The display device according to any of (2) to (10), wherein,
  the first electrode, the second electrode and the electrically controlled birefringence crystal layer are provided in such a way that a direction of the electric field is perpendicular to a transmitting direction of a light beam in the electrically controlled birefringence crystal layer, and a size of a driving voltage is in inverse proportional relationship with a primary electro-optic coefficient of the crystal material for the electrically controlled birefringence crystal layer, and is in inverse proportional relationship with a thickness-to-width ratio 1/d of the electrically controlled birefringence crystal layer; or
  the first electrode, the second electrode and the electrically controlled birefringence crystal layer are provided in such a way that a direction of the electric field is parallel to a transmitting direction of a light beam in the electrically controlled birefringence crystal layer, and a size of a driving voltage is in inverse proportional relationship with a primary electro-optic coefficient of the crystal material for the electrically controlled birefringence crystal layer.

(12) The display device according to any of (2) to (10),
  wherein, the first electrode, the second electrode and the electrically controlled birefringence crystal layer are provided in such a way that a direction of the electric field is perpendicular to a transmitting direction of a light beam in the electrically controlled birefringence crystal layer, when a driving voltage is constant, a thickness of the electrically controlled birefringence crystal layer with the primary electric-optic effect is directly proportional to the distance between the first electrode and the second electrode, or, a thickness of the electrically controlled birefringence crystal layer with the primary electric-optic effect is inversely proportional to a primary electric-optic coefficient of the electrically controlled birefringence crystal.

(13) A manufacturing method of a display device, comprising:
  providing a first substrate;
  providing a first polarizer and attaching it to the first substrate;
  providing a second polarizer and disposing it to face the first substrate;
  forming a first electrode and a second electrode which separate from each other on the first substrate with the first polarizer attached or on the second polarizer, so that the first electrode and the second electrode are interposed between the first substrate and the second polarizer; and
  forming an electrically controlled birefringence crystal layer with a primary electro-optic effect between the first electrode and the second electrode.

(14) The manufacturing method of the display device according to (13), wherein the first electrode and the second electrode are formed in accordance with a state in which a direction of an electric field generated between the first electrode and the second electrode is parallel or perpendicular to the first substrate; and the electrically controlled birefringence crystal layer modulates light passing through it under the action of the electric field.

(15) The manufacturing method of the display device according to (13) or (14), wherein a metal layer used to fabricate the first electrode and the second electrode is formed by means of sputtering or evaporation, and the metal layer is patterned so as to form the first electrode and the second electrode;

or, the electrically controlled birefringence crystal layer is formed by means of sputtering or evaporation.

(16) The manufacturing method of the display device according to any of (13) to (15), further comprising:

disposing a backlight source on a side of the first substrate opposite to the side on which the second polarizer is disposed.

(17) The manufacturing method of the display device according to any of (13) to (16), further comprising:

producing color filter layers;

bonding the color filter layers to or integrating the color filter layers with the second polarizer.

The foregoing are merely exemplary embodiments of the invention, but not used to limit the protection scope of the invention. The protection scope of the invention is defined by attached claims.

What is claimed is:

1. A display device, comprising:
a first substrate;
a first polarizer which is disposed below the first substrate and parallel to the first substrate;
a second polarizer, which is disposed above the first substrate and parallel to the first substrate;
a first electrode and a second electrode, which are disposed between the first substrate and the second polarizer;
an electrically controlled birefringence crystal layer, which is disposed between the first electrode and the second electrode, actualizes display and has a primary electro-optic effect, wherein the crystal is single-axis crystal, the crystal layer has the shape of a cuboid, and a thickness of the cuboid is larger than a width of the cuboid;
further comprising:
a backlight source, which is disposed below the first polarizer and parallel to the first polarizer, wherein the backlight source is a RGB light source, and adopts a field sequential control mode to achieve color display;
the first electrode and the second electrode are disposed in accordance with a state where a direction of an electric field is parallel or perpendicular to the first substrate; and the electric field is an electric field generated between the first electrode and the second electrode; the electrically controlled birefringence crystal layer actualizes display under the action of the electric field;
in case of an electric field being parallel to the first substrate, an optical axis of the crystal is parallel to the first substrate, a size of a driving voltage is in an inversely proportional relationship with a primary electric-optic coefficient of a crystal material, and is in an inversely proportional relationship with a thickness-to-width ratio (l/d) of the crystal;
in case of an electric field being perpendicular to the first substrate, an optical axis of the crystal is perpendicular to the first substrate, and a size of a driving voltage is in an inversely proportional relationship with a primary electric-optic coefficient of the crystal material.

2. The display device according to claim 1, wherein the first electrode and the second electrode are disposed in accordance with a state in which a direction of an electric field generated therebetween is parallel or perpendicular to the first substrate, and the electrically controlled birefringence crystal layer modulates light passing therethrough under the action of the electric field.

3. The display device according to claim 1, wherein the electrically controlled birefringence crystal layer changes a polarization state of the light passing therethrough under the action of the electric field.

4. The display device according to claim 1, further comprising:

color filter layers provided on the second polarizer, wherein the first substrate is an array substrate having a thin film transistor structure; and, wherein the array substrate are formed with gate lines and data lines thereon, and the gate lines and the data lines cross with each other to define pixel units, within which thin film transistors are formed, and the thin film transistors are turned on or off under the control of the gate lines.

5. The display device according to claim 4, further comprising:

a gate driver, which is connected to the gate lines of the array substrate and transmits a scan signal to the gate lines of the array substrate; and a source driver, which is connected to the data lines of the array substrate and transmits a data signal to the data lines of the array substrate.

6. The display device according to claim 1, wherein the material of the electrically controlled birefringence crystal layer with the primary electro-optic effect comprises a lithium niobate crystal or a potassium dihydrogen phosphate crystal.

7. The display device according to claim 6, wherein the lithium niobate crystal or the potassium dihydrogen phosphate crystal is shaped in a cuboid.

8. The display device according to claim 1,
wherein, in case of an electric field being parallel to the first substrate, upon a driving voltage being constant, a thickness of the electrically controlled birefringence crystal layer with the primary electric-optic effect is directly proportional to the distance between the first electrode and the second electrode, or, a thickness of the electrically controlled birefringence crystal layer with the primary electric-optic effect is inversely proportional to a primary electric-optic coefficient of the electrically controlled birefringence crystal.

* * * * *